Sept. 12, 1967          J. R. McCONNELL          3,341,683

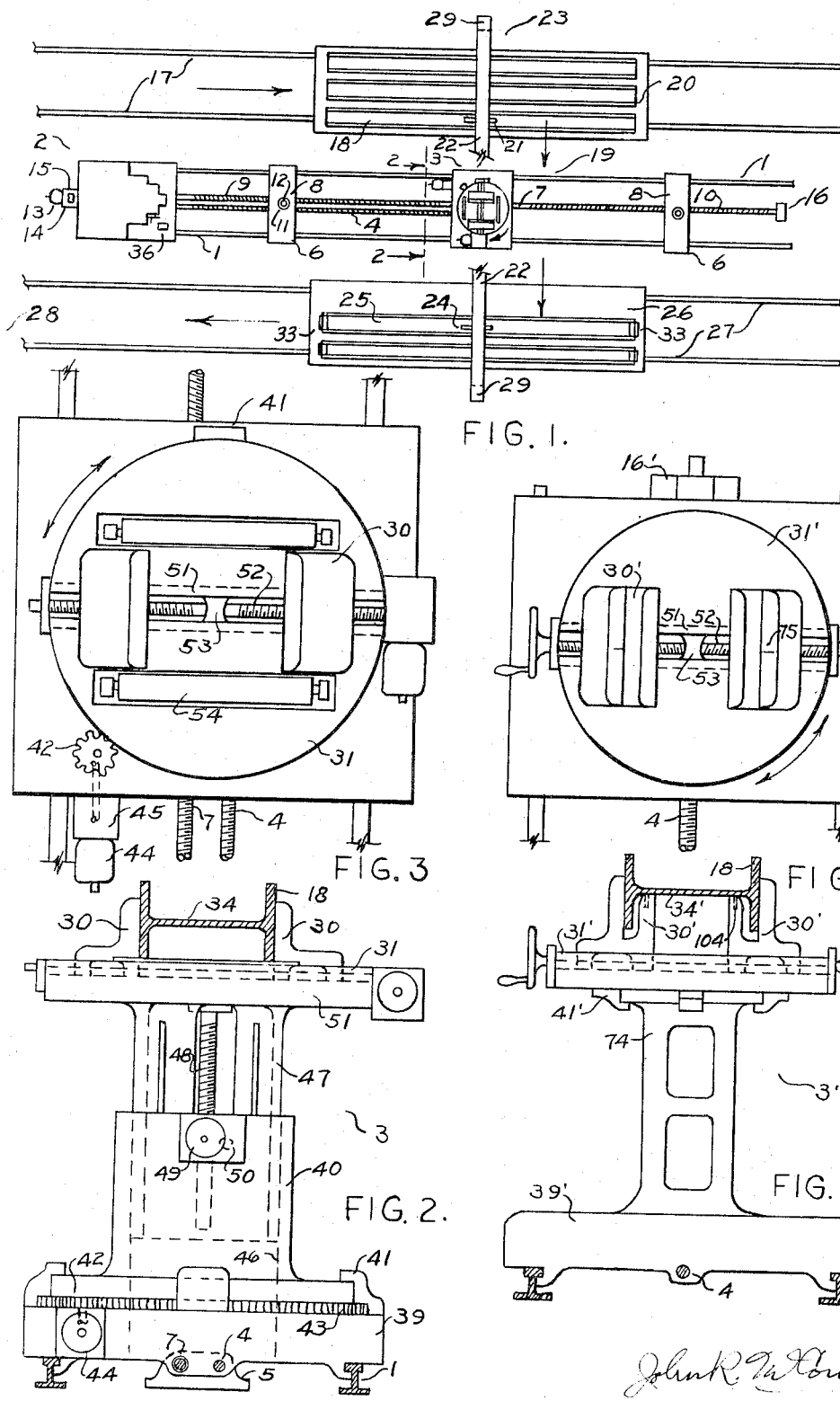

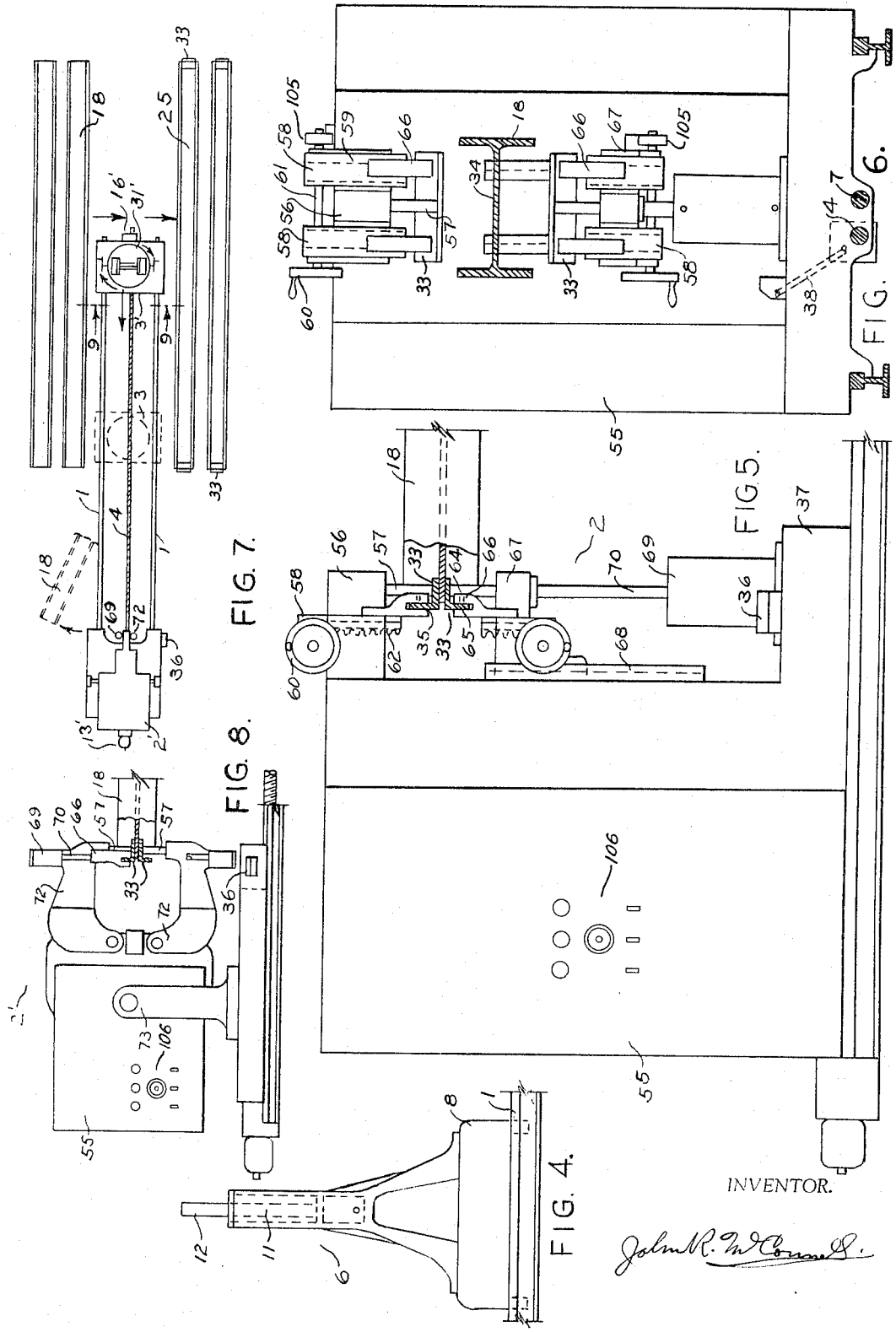

AUTOMATIC RESISTANCE WELDING MACHINE

Filed April 3, 1964          3 Sheets-Sheet 3

INVENTOR.
John R. McConnell

United States Patent Office 3,341,683
Patented Sept. 12, 1967

3,341,683
AUTOMATIC RESISTANCE WELDING MACHINE
John R. McConnell, 148 Woodside Ave.,
Ridgewood, N.J. 07450
Filed Apr. 3, 1964, Ser. No. 357,207
9 Claims. (Cl. 219—80)

This invention relates to a combined resistance spot welder and steel handling apparatus for the automatic fabrication of structural steel beams.

It is an object of the present invention to set forth an apparatus for the handling, moving, preparing, assembling and fastening together of the plural component work pieces consisting of the main rolled shape and the connection angles and similar details.

The primary objective is to provide an integrated coacting apparatus that will produce unit members that are completely finished unitary end products ready for erection-assembly in a structure.

Another objective is to provide a machine that will automatically convey, position, length-centre, measure, layout, assemble and fabricate the member, producing a completed member of precise overall length from a raw shape of random-shorter length.

It is also an objective to provide a simple, versatile, flexible, apparatus at minimum cost which will perform the fabrication in a single handling of the material.

Another objective is to provide a means that will quickly process members of various lengths, depths, widths, and weights, without mechanical changes to any part of the combined apparatus.

Figure 11:
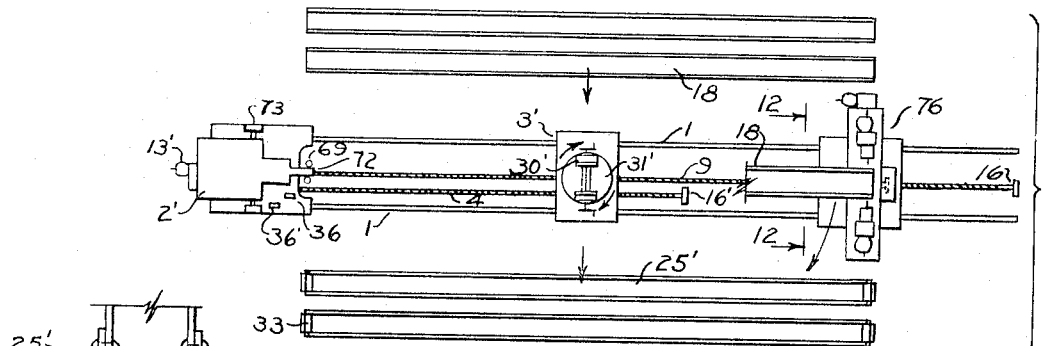
Figure 12:
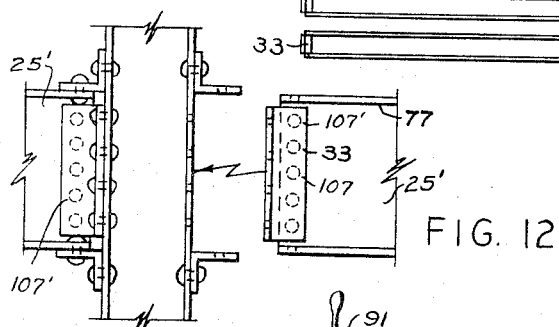
Figure 13:
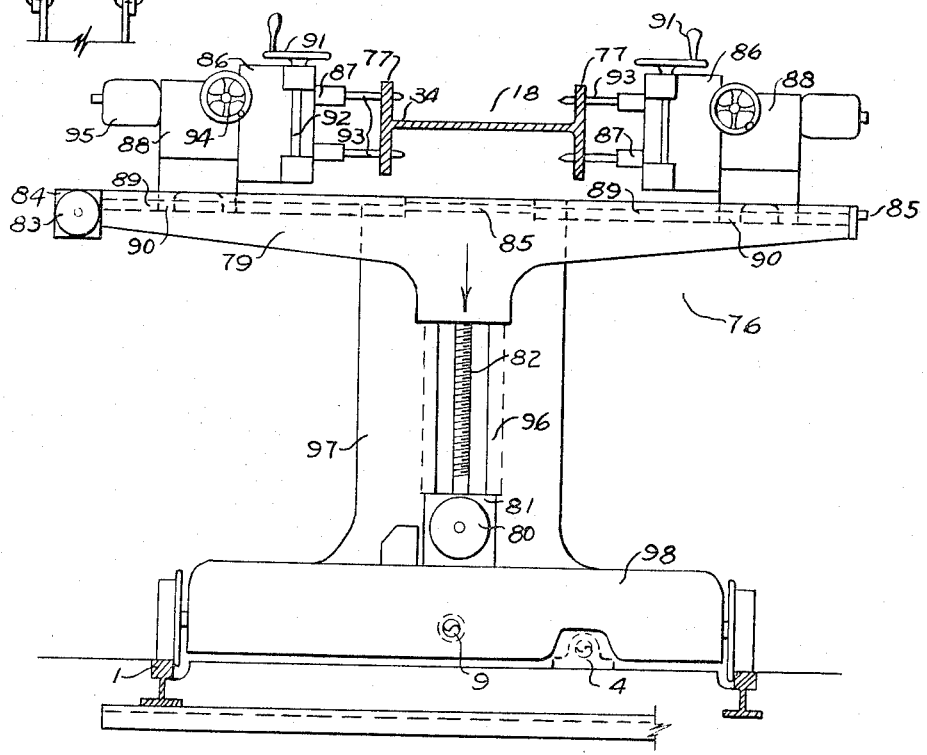
Figure 14:
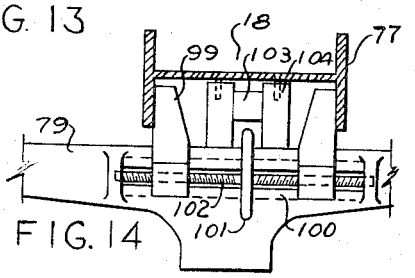

For other objects and a better understanding of the invention reference may be had to the following detailed description taken in conjunction with the accompanying drawing in which:

FIG. 1 is a plan layout of the welding apparatus.
FIG. 2 is an end elevation of the shape rotator and carrier.
FIG. 3 is a plan of the shape rotator and carrier.
FIG. 4 is an end elevation of a shape length centering ram.
FIG. 5 is a side elevation of the resistance welder.
FIG. 6 is an end elevation of the resistance welder.
FIG. 7 is a plan layout of an alternate elementary welding apparatus.
FIG. 8 is a side elevation of a pincers type resistance welder.
FIG. 9 is an end view of a simplified shape carrier-rotator.
FIG. 10 is a plan view of a carrier-rotator of FIG. 9.
FIG. 11 is a plan layout of an alternate welding drilling apparatus.
FIG. 12 is an elevation of a structural steel building connection.
FIG. 13 is an end elevation of an underslung multiple drilling unit.
FIG. 14 is a detail of a shape holding mechanism.

FIG. 1 shows a two rail 1 track with an end welder 2 mounted on the left end of same. At the centre of the length of said track an elevatable shape carrier and rotator 3 is mounted. A threaded shaft 4 is threaded through the left side of base of the said carrier and is longitudinally anchored by a centre anchorage 5 at the centre of length of the track 1, under the centre of the rotator 3 as in FIG. 2. A pair of dual travellers 6 are symmetrically mounted about the centre anchorage 5 on the tracks, with a full-length threaded shaft 7 threaded through the bases 8 of said travellers. The shaft passes through but free of the base of the rotator 3 and is longitudinally anchored in the centre anchorage 5. Opposite ends of the shaft are oppositely threaded 9 and 10 to symmetrically converge or diverge the dual travellers in respect to the centre anchorage 5. A vertical cylinder 11 with a vertically projectible piston rod 12 is mounted on the tops of each of the bases 8. Shafts 4 and 7 are independently rotated in either direction by motor 13 speed reducer gear box 14 and gear shift 15, with outer end of shaft 7 journalled in bearing 16.

Fabricating track 1—1 is parallelled on one side by track 17 on which nested stacks of raw I or H shapes 18 are brought to the operating area 19 on flat cars 20 for fabrication. Electric hoist 21, transversely movable on cross-beam 22 of gantry frame 23 that spans all tracks, transfers individual shapes 18 to shape carrier 3 for fabricating. On completion of the fabricating operation, a similar hoist 24 with expanding jaws transfers the completed member 25 to flat car 26 on parallel track 27 for movement to the shipping area 28. Gantry frame posts are 29.

With carrier 3 centered over anchorage 5, raw shape 18 is placed in the jaws 30 of turntable 31 of carrier 3 approximately length-centred over the centre of the table. Diverged length centering travellers 6, with their piston rods 12 extended, are then symmetrically converged against the ends of shape 18 to precisely length-centre the shape over the mid-length anchorage 5 of said travellers 6. Jaws 30 are then locked on shape and shaft 4 is rotated to longitudinally move one end of the shape forward to welder 2, to have dual connection angles 33 welded to opposite sides of the web 34 of said shape, as described under FIGS. 5 and 6. On completion of the weld, the welder opens to release the end of shape, whereupon the table of carrier-rotator 3 is lowered and revolved to rotate shape 180° for the welding of connection angles 33 to the other end of the shape. The shapes ordered from the rolling mills, according to standard trade practice, vary between one-half inch and one and one-half inches shorter than the overall length of the completed member 25. It is required that the connection angles overhang equally at each end of shape for the required strength of joint. To effect this, the carrier is moved to a distance one-half the length of the finished member from the operating centre 35 of the welder 2. This is measured by the direct reading dial 36 on the base 37 of welder that is direct connected by a train of gears and shafts 38 to the carrier-moving shaft 4.

FIGS. 2 and 3 show a rail-mounted 1 base 39 longitudinally movable by reversible shaft 4, circular body casting 40 centred on base 39 and retained by brackets 41 is fully rotatable by spur 42 and ring gears 43 driven by motor 44 and speed reducer 45. Within the well 46 of the body casting, a guided vertically projectible cylinder 47 terminates in a powered turntable 31. The cylinder is elevated by a centrally located screw 48 attached to the table and actuated by a motor 49, train of gears, and a horizontal shaft 50. Powered converging jaws 30, T-keyed 51 to table 31 top, lock the shape in position by threaded shaft 52 after the transverse mid-length axis of shape is located over the centre 53 of the table top 31 on rollers 54.

FIG. 4 shows a side view of one of the dual length-centering travellers 6 comprising, a rail 1 mounted base 8 with a vertically projectible piston rod 12 in a cylinder 11 on top of the base. With piston withdrawn, the shape can be swung over or projected past the traveller 6.

FIGS. 5 and 6, a side and end view of resistance welder 2, show the case 55 housing the transformer and the timer and controls 106, with a fixed top platen 56 holding the stationary top electrode 57. Retractable angle-assembling grips comprising dual slides 58, T-keyed 59 into front face of said platen and operated by hand-wheel 60 shaft 61 gear and rack 62, hold a dual connection angle 33 by means of spring detents 64 in slotted 65 grips 66 bolted to the slides 58. A brake 105 on shaft 61 by means of the slides and grips holds the angle 63 against the upper electrode 57.

The lower platen 67, T-keyed at 68 to the case 55 and elevated by cylinder 69 piston and piston rod 70 on projecting base 37 of the welder, is similarly equipped to hold the lower mating connection angle 33. The end of the shape 18, longitudinally projected between the platens of the welder, is moved in by the carrier-rotator 3, until the dials 36, recording the distance from the operating centre 35 of the welder to the mid-length point of the shape over the centre of the rotator-carrier register one-half of the over-all length of the finished member 25. Pressure is then introduced under the piston to raise the lower connection angle 33 against the web 34 of the shape, that is supported mid-way between the platens and made to press the web against the upper angle 33 as the carrier 3 simultaneously elevates the shape. The timed welding current-pressure sequence is then impressed across the three contacting pieces of steel, tightly gripped between the upper and lower electrodes, forging a compound-chain spot resistance weld 107 at approximate mid-depth of the shape. The grips are then retracted by the hand wheels 60 and shape is swung slightly back and forth to effect multiple adjacent compound spot welds 107' by successive electrode closures at the same end of shape. The shape is then rotated 180° horizontally as hereinbefore mentioned and the welding operations are repeated to complete the member, when it is discharged to car 26.

FIG. 7 shows a plan-layout of an elementary resistance welding apparatus, considerably simplified and suitable for smaller shops with low production requirements. The items, layout and operations are, in general, the same as described under FIG. 1, therefore, the part numbers are the same. Raw shapes may be brought by overhead bridge crane with finished members removed similarly. A jib crane or small floor crane may load the carrier-rotator. The mid-length point of the shape is determined by tape and manually marked on each shape. The shape is then placed in the jaws of carrier-vise with said mark matched to the centre line mark of the table which is also shown on the top of the jaws of FIG. 10. After clamping, the carrier is then advanced longitudinally to the dotted location shown, which constitutes a dimension from the welder equal to half the overall length of the finished member and is so indicated on the dial register. The dotted fragment of a member shown at an angle past the track indicates partial rotation after the welding of the first connection angle to bring the other end of the shape under the welder to complete the member.

FIG. 8 shows a side elevation of a pincers 72 type trunnion 73 mounted resistance welder with cylinders, pistons, piston rods and grips vertically projecting dual connection angles against the web of the shape. One grip 66 is removed to show the welding electrode. The pivoted dual arms of the welder close symmetrically on the shape web 34, that is held stationary.

FIGS. 9 and 10 show an elevation and plan of a simplified carrier-rotator 3', longitudinally moved by powered screw 4. The table 31' is rotatable on a standard 74 mounted on the movable base 39'. A screw, oppositely threaded through dual clamping jaws, grips and supports the shape by the web of the shape. Various sizes of shapes are thus held at an approximately uniform elevation to fit properly to the welding jaws of the welder of FIG. 8. Adjustable height set screws 104 adjust the centre-line of thick or thin webs to a uniform elevation. The centre 75 of carrier 3' is marked on the top of the jaws 30' of the table 31'.

FIG. 11 shows the layout of FIG. 7 with the addition of an underslung drilling unit 76 for the drilling of the dual flanges of the shape 18 at the extreme ends of same. This is required where connection must be fabricated with seat and cap angles as shown in FIG. 12 to stiffen a structure against wind or other lateral forces.

In the case of a member requiring varied plural fabricating operations, the combined mechanism can perform said different operations simultaneously on opposite ends of a shape and upon rotation of the shape repeat them, to completely finish the fabrication of the member 25' in a single handling of the shape.

In operation, the mid-length point of each shape is marked on it. The carrier rotator 3' is then moved to a location whose distance from the centre of operation 35 of the welder 2' is one-half the overall length of the finished member 25'. This will be shown on dial 36. The distance of the dual multiple drill 76 as shown by dial 36' will be set from the welder twice the distance given for the carrier-rotator 3'. The raw shape 18 is then centred and locked in the jaws 30' of the carrier and lined up for simultaneous welding and drilling. As the welding electrodes 57 with dual grips 66 holding connection angles 33 close on the left end of the shape to effect a spot weld at mid-depth of web 34 of shape, the gang drill 76 is elevated at the opposite end of the shape to drill both flanges 77. With initial operations completed drill heads 86 are retracted and lowered, connection angle grips are retracted, welder jaws are opened and shape is slightly rotated horizontally back and forth to place additional spot compound welds on the left end as required. On completion of this phase, the shape is rotated end for end and the above operations are repeated, when all mechanisms are opened and retracted to release the completed member 25' for discharge. Material piles 18 and 25' are kept low for rotating clearance. This represents a complete cycle.

With the mechanism shown, except for the manual determination of the mid-length points, members are completely laid out and fabricated to precise length from shorter shapes of random length by the co-ordinated apparatus. For shops of moderate output, this apparatus at a minimum investment gives high production at lowest cost. This method of dissimilar simultaneous operations may be applied to other fabricating operations, specifically; welding plus coping or web drilling plus coping.

FIG. 12 shows an enlarged view of the typical end of the member 25' about to be assembled to the supporting column in the field. At the left is shown a similar member riveted in place.

FIG. 13 shows the underslung dual-sided multiple-drilling mechanism 76. With the table 79 depressed, the shape 18 is rotated to bring it over the centre line of the fabricating unit 76. Motor 80, speed reducer 81 and threaded shaft 82 are activated to raise mechanism on table 79 that is T-keyed 96 to a short rear wall 97 rising from a base 98 mobiley mounted on the tracks 1 of layout 11. An adjustable motor switch (not shown) on wall 97 controls the height of the table. Motor 83 speed reducer 84 and shaft 85 are activated to converge adjustable centre two-spindle dual drill-heads 86 against the opposite flanges 77 of shape 18 located intermediate of said heads. The drill head, with chucks 87 on spindles, is mounted on a speed-reducer gear box 88 T-keyed 89 to the table top 79, with the re-spacing shaft 85 threaded through depending lugs 90 keyed into the T-track 89 in table 79. Hand wheel 91, shaft 92 and gearing adjusts the variable centre to the centre distance of drills 93. Geared hand wheel 94 corrects the verticality of the paired drills 93 by tilting the drill head 86. Motor 95 powers the drills.

FIG. 14 shows divergible dual fingers 99 T-keyed 100 to the face of the table 79, and expanded into the trough of the shape 18 by hand wheel 101 and shaft 102, with oppositely threaded ends for the steadying of the work piece against the drilling. On the top of the table, a coil energized magnet 103 with adjustable height set screw 104 in the centre pulls the work down as required to centre the dual drills 93 about the centre-line of the flanges 77.

There is an inherent procedure and method in the layout and apparatus set forth that measures, lays out, and assembles the members which can be applied to different fabricating operations.

While various changes may be made in the detail construction, it shall be understood that such changes shall be within the spirit and scope of the present invention, as defined by the appended claims.

What I claim as new and desire to protect by Letters Patent of the United States is:

1. A resistance welder comprising a transformer and controls, case with upper platen and vertically aligned lower platen elevatable by a powered piston, dual retractable angle-assembling grips and dual opposed bar electrodes on said platens, a mobile carrier with powered elevatable turntable and shape-clamping vise longitudinally adjustable by powered threaded shaft on an aligning track and electric current, whereby a shape length-centered and clamped in the vise is longitudinally moved and intermediately located between the platens and elevated as the platens converge the connection angles against opposite sides of the web of the shape, and electrodes effect multiple adjacent compound-chain spot welds by a series circuit through the assembled work pieces as the shape is slightly rotated, whereupon the carrier rotates the shape 180° and a similar operation is performed at the opposite end of the shape to completely lay out, assemble and fabricate a symmetrical beam.

2. A resistance welder as in claim 1, further comprising dual shape length-centering travellers symmetrically convergible by powered oppositely threaded shaft against the ends of said shape supported in said vise, whereby said shape is length-centered and locked on said carrier for longitudinal movement and symmetrical fabrication in the rotation of said shape about the center-of-length of said shape.

3. A resistance welder as in claim 2, further comprising a transverse overhead rail spanning the said aligning track and adjoining storage areas for raw shapes and finished members, and a hoist with shape grips operable along said rail, whereby the work material can be moved through the fabricating apparatus to completion without delay, in one continuing mechanized operation.

4. A resistance welding apparatus for structural beams comprising, a transformer, controls, in integral C frame having a fixed top platen vertically aligned over a lower platen elevatable by attached piston in cylinder on base, dual retractible slotted angle-holding grips, co-ordinated with vertically-aligned dual bar electrodes on said platens, shape-carrier movable on an aligning track by a motorized drive, said carrier mounting a turntable and shape vise elevatable above base by a motorized drive, fluid power means and electric current means, whereby a structural shape length-centered and locked in said vise is moved longitudinally by carrier to bring one end of said shape between said grips whereupon the turntable and lower platen are raised converging dual connection angles against opposite web faces of the shape, a welding current is impressed across the angle-contacting electrodes and the three member elements, creating a compound-chain spot weld, after which said turntable and platen are lowered, grips are retracted, and on limited rotation of shape and repeated converging of the electrodes additional spaced spot welds are made following which the turntable horizontally rotates the shape 180 degrees when a similar multiple welding operation is preformed at the opposite end of the shape to complete the measurement, layout, assembly and fabrication of a symmetrical member.

5. A welding apparatus as in claim 4, further comprising a focal shaft anchorage block between rails of said aligning track, a motorized rotatable shaft longitudinally held in said anchorage, and oppositely threaded through the bases of dual rail-mounted travellers symmetrically disposed about said anchorage, said travellers mounting hydraulically-powered vertically-extensible bars for contacting the opposite ends of said shape, whereby when the travellers are symmetrically converged toward the anchorage with the bars extended the said supported shape is length-centered over the said anchorage and also over the center of the supporting carrier located at said anchorage, whereupon the clamping jaws of the said vise are locked on the shape, traveller bars are retracted and the carrier moves the shape longitudinally between the said welder platents for the welding operation.

6. A beam assembling and welding mechanism comprising, dual opposed pairs of slotted angle holding-assembling grips mounted on dual pairs of toothed racks vertically projectible in T-slotted platen supports by handwheels, shafts and paired gears, sprung angle-holding detents in said grip, friction brakes on said shafts for temporary fixed positioning of dual connection angles against dual opposed co-ordinated welding electrodes, electric welding current means and a powered platen-converging means whereby, dual connection angles transversely converged against opposite web faces of an intermediately located shape, are welded thereto by a single compound-chain spot weld, whereupon the said assembling grips are retracted from the welding area, permitting the execution of plural spot welds on any depth of shape in any spacing, number of rows and pattern.

7. A pincers-action resistance welding apparatus comprising, a transformer and controls in a case having motorized-power-pivoted dual convergible welder arms carrying dual paired angle-assembling grips vertically retractible by attached pistons in cylinders and co-ordinated dual opposed bar electrodes, a shape carrier longitudinally movable on an aligning track, said carrier supporting a turntable mounting a shape-clamping vise, electric current means and fluid power means, whereby the mid-length point of a shape is located over the centre of turntable and locked in the vise, the carrier is moved to project the shape end between the welder arms, dual connection angles in grips backed by electrodes are converged by the arms against opposite sides of the web of shape and are compound spot-welded thereto; the grips are retracted, plural adjacent spot welds are effected by repeated arm closures as the shape is slightly rotated, whereupon the shape is rotated 180 degrees and a similar welding operation is performed at the opposite end of shape to completely fabricate a symmetrical member in one co-ordinated operation.

8. A pincers resistance welder as in claim 7 further comprising a transverse overhead rail spanning the said aligning track and adjoining shape-material areas, and a shape hoist operable along said rail, whereby said material can be moved to completion through the fabricating apparatus, without delay, in one continuing coordinated mechanized operation.

9. A pincers resistance welder as in claim 7 further comprising, paired adjustable-center horizontal drills in dual motor-powered transversely spaced drill-heads transversely convergible on a supporting table elevatable above a track-mounted base by a motor, motor-powered right and left threaded converging shaft through said heads, motor-powered threaded shaft through said base to locate the drilling mechanisms near the opposite end of the vertical flanges of said shape for simultaneous drilling of said flanges co-incident with welding at the other end of shape.

References Cited

UNITED STATES PATENTS

| | | | |
|---|---|---|---|
| 1,311,789 | 7/1919 | Abbott | 219—159 X |
| 1,898,468 | 2/1933 | Tapman | 219—150.5 |
| 2,479,197 | 8/1949 | Anderson | 219—159 |
| 3,052,140 | 9/1962 | Guyer | 29—155 X |
| 3,054,887 | 9/1962 | Brooks | 219—159 X |
| 3,066,394 | 12/1962 | Litzka | 29—155 X |
| 3,085,148 | 4/1963 | McConnell | 219—79 |
| 3,113,373 | 12/1963 | Guyer | 29—155 |

RICHARD M. WOOD, *Primary Examiner.*

A. BARTIS, B. A. STEIN, *Examiners.*